May 2, 1933.  J. P. KELLY  1,906,614
MECHANISM FOR ELIMINATING DEAD CENTERS
Filed Nov. 30, 1931
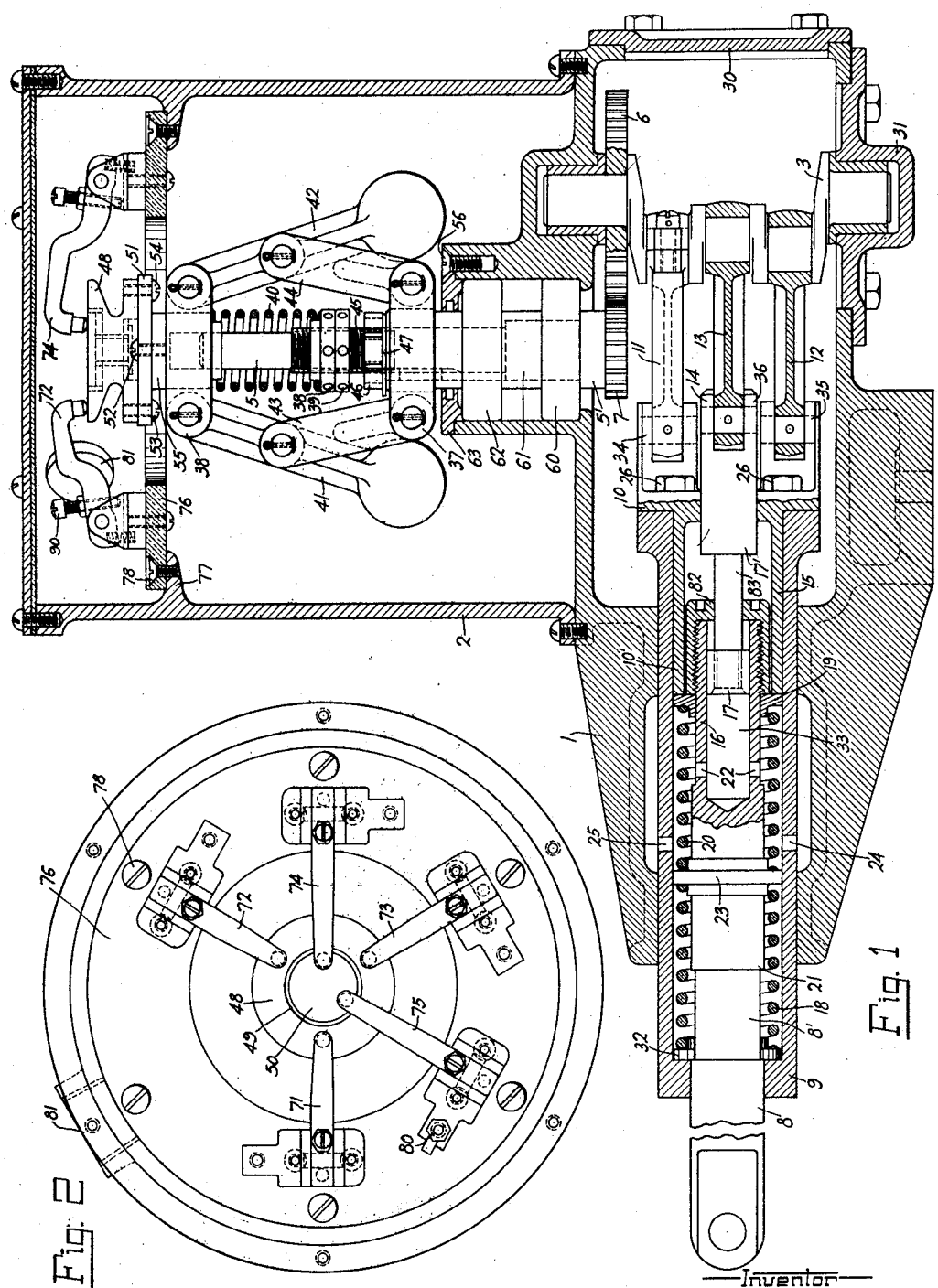
Inventor
John P. Kelly Patented May 2, 1933

1,906,614

UNITED STATES PATENT OFFICE

JOHN P. KELLY, OF PITTSFIELD, MASSACHUSETTS, ASSIGNOR TO ASSOCIATED ELECTRIC LABORATORIES, INC., OF CHICAGO, ILLINOIS, A CORPORATION OF DELAWARE

MECHANISM FOR ELIMINATING DEAD CENTERS

Application filed November 30, 1931. Serial No. 577,923.

The present invention relates in general to an improved mechanical movement designed to be employed for converting reciprocatory movement into movement of rotation, the object of the invention being to provide an assemblage of mechanical elements which will co-operate to overcome dead centers.

An illustrative embodiment of the invention is shown in the accompanying drawing, wherein Fig. 1 is a view of the invention in elevation and partially in section and as employed to drive a train control governor; while Fig. 2 is a plan view of the governor employed, but with the cover removed.

In the drawing the reference numeral 1 denotes a suitable fixed support and casing for the mechanical elements of the device; the numeral 2 denotes a casing, supported by casing 1, which serves as a housing for the governor mechanism; while the numeral 8 denotes the shaft employed to drive the governor, through the medium of mechanical elements, included in casing 1.

In order to describe the invention, the manner of assembling the various parts thereof will be explained.

The spring 18 is first placed over the left-hand end of the shaft 8 and is then partially compressed against the left surface of a spring stop 23, which is integral with the shaft 8. The spring is then held in position in its semi-compressed state by a spring retaining horseshoe 32 slid over the depressed portion 8' of the shaft 8. The spring 20 is next placed over the right-hand end of shaft 8, and is also compressed to the same extent as is the spring 18. The end of an auxiliary connecting rod drive shaft 83, on which has been placed a nut 82 and on which has been threaded and riveted an operating element 17, is now inserted in the bore 33 in the end of shaft 8 with the nut 82 threaded thereto. The spring 20 is therefore held in a semi-compressed state by the retaining washer 19 and the nut 82.

The shaft, spring, and auxiliary connecting rod drive shaft assembly, as just described, is now inserted in the cylinder or barrel number 9, with the left-hand end of shaft 8 extended through the cylinder for connection with an appropriate driving means.

The sleeve portion 10' of a connecting rod carrier 10 is now slid over the nut 82 and is held in fixed relation to the cylindrical portion 9 by cap screws 26.

The connecting rods 11 and 12 are secured to the carrier 10 by the usual wrist pins 34 and 35, while the connecting rod 13 is connected in the usual manner by wrist pin 36.

The whole assembly, so far described, is now inserted in the casing 1, through the opening shown closed by a cover 30. With the assembly properly positioned, the cylinder portion 9 extends out through the left-hand end of casing 1.

The three-crank crankshaft 3, having a driving gear 6 keyed to its upper end, is now inserted, via the opening shown covered by the cover 31, into the casing 1 and into the bearing provided in the casing. The cover 31, containing the lower bearing for the crankshaft, is now fixed in place.

The connecting rods 11, 12, and 13 are now properly connected to the cranks of crankshaft 3 and the cover 30 fixed in place.

Operation

The normal tension of springs 18 and 20 is greater than the inertia required to rotate the crankshaft. Therefore, with the left-hand end of shaft 8 properly connected to a locomotive piston cross-head, or to any other reciprocating member thereof, the shaft 8 and cylinder element 9 will be reciprocated as a unit, and, through the medium of their connecting rods 11 and 12, will rotate the gear 6 and hence gear 7 and the governor, at a speed contingent on the rate of reciprocation of the shaft 8. The crank to which the connecting rod 13 is pivoted is offset 30° with respect to the cranks of connecting rods 11 and 12. As the nut 82 on shaft 8 continues to oscillate, it never quite reaches either element 17 or 17' of shaft 83, because these elements are at the same time being oscillated by the crank of connecting rod 13. Therefore, in the operation as above outlined, the connecting rod 13 and its crank will simply drive its carrier shaft 83 back and forth without in any way affecting the drive.

It will now be assumed that the shaft 8 has ceased to operate or that it is operating so slowly that there is not sufficient inertia in the crank and governor to carry the crank past dead center position. Under such circumstances, with the crank in a dead center position, and with a further movement of cylinder 9 consequently blocked, a further movement of shaft 8, by compression of one of the springs 18 or 20, may still occur.

In the drawing, the crankshaft 3 is shown with the cranks, to which connecting rods 11 and 12 are connected, on dead center as a result of the shaft 8 having been moved to its extreme left.

The shaft, in moving to the right, carries with it the spring retaining horseshoe 32 and the spring stop 23. Obviously, therefore, the distance between these elements remains the same and the semi-compressed state of spring 18, accordingly, remains unaltered. Since the spring retaining washer 19 is adjacent part 10' of the connecting rod carrier 10, now in a dead center position, movement of this spring retaining washer cannot occur. Consequently, as the shaft 8 moves to the right, the spring 20 is compressed until the nut 82 on the right-hand end of the shaft 8 encounters operating element 17' of the auxiliary connecting rod drive shaft. As the shaft 8 continues to move to the right, it now carries the auxiliary connecting rod drive shaft with it and, through the medium of the connecting rod 13, moves the crank 3 off dead center. When this occurs, the excess pressure against spring 20 is again removed and the shaft 8, under tension of spring 20, again assumes its normal position with respect to the cylinder 9, which now, through the medium of carrier 10 and connecting rods 11 and 12, once more functions to drive the crankshaft 3.

Had the shaft 8 stopped in its extreme right-hand position, the subsequent movement would have been to the left, instead of to the right as just described. The operation would have been substantially the same except that, as the shaft 8 moves to the left, it carries the stop 23 and spring retaining washer 19 with it; and, since the distance between these elements remains the same, no further compression of spring 20 occurs at this time. The spring retaining horseshoe 32, however, is butted up against the end of cylinder 9, now assumed to be in a dead center position, and therefore cannot move with the shaft 8. Accordingly, as this shaft moves to the left, spring 18 is compressed until nut 82 encounters the operating element 17 of the auxiliary connecting rod drive shaft. As the shaft 8 continues to move to the left, it now carries the auxiliary drive shaft with it to again move the crankshaft 3 off dead center. Obviously, as soon as this occurs, the spring 18 again expands to its normal semi-compressed condition and the crankshaft 3 is once more driven by the connecting rods 11 and 12.

Efficient distribution of the lubricant to the various working parts within the casing 1 is insured by the churning effect of the crankshaft and breather action. As will be seen, the shaft 83 is drilled to enable the lubricant to readily enter the bore 33 of shaft 8, through the holes 22 therein and thence via the holes 24 and 25 to the exterior of cylinder 9.

*Governor assembly*

In the assembly of the governor, a pinion 7 is first secured to the lower end of shaft 5. The ball bearing assembly 60, spacer 61, and the ball bearing 62, respectively, are now placed on the shaft in the order named. An oil seal cover 63 is next placed on the shaft. A collar 37 is now securely keyed to the shaft 5 and is prevented from sliding upwardly thereon by a nut 46 threaded on the shaft and held in place by a lock washer 47. Immediately above the nut 46, lock and adjusting nuts 38 and 39 are threaded on the shaft.

In the next step, in the assembly, a disk 51, of insulating material, is secured to a contacting member 48 by screws 53 and 54 passing through the insulating disk and threaded into the contacting member. The disk 51 is now secured to a flange portion 55 of the fly ball carrier 38. The fly balls and their connecting links 41 and 42 are now pivotally secured to clevis portions of the carrier.

The spring 40 is next placed over the upper end of shaft 5, and, with the spring 40 slightly compressed, the fly ball assembly is anchored to the collar 37 through the medium of connecting links 43 and 44.

An appropriate amount of lubricant is now introduced, through the opening at the top of casing 1, after which the lower end of the governor assembly, is inserted in the casing 1, with pinion 7 in mesh with the driving gear 6. With the bearings 60 and 62 in place and with the cover 63 held in place by screws 56, the shaft 5 is firmly held against endwise movement, and is in readiness for operation.

The previously mentioned contact member 48 comprises two circular metallic elements designated 48 and 50, respectively. These are insulated from each other by insulation 49.

In the next stage of the assembly, contacting members 71 to 75, inclusive, are pivotally secured to a ring 76, of insulating material. The ring 76 is placed on a ledge 77 formed within the governor casing 2 and is secured in place by a number of screws 78. With this assembly in place, the contact members 71, 72, and 73 are brought into operative relation with the metallic contacting element 48 of the governor, while the contact members 74 and 75 are brought into operative relation with the metallic element 50 of the governor. Suitable terminals 80, at the base of the contact member assemblies 71 to 75, enable the necessary connections to be made with equipment to be controlled by the governor. Such leads are brought into the casing through an opening 81. By variably adjusting the set screws 90 of the various contact members 71 to 75, these can be made to variably control circuits in accordance with the speed of the governor.

What is claimed is:

1. In a driving arrangement for converting reciprocatory motion into rotary motion, a rotatable crankshaft, a load to be driven by said crankshaft, a reciprocatory shaft oscillatable in a fixed plane and having connecting rods through the medium of which it can transmit rotary motion to said crankshaft, an auxiliary connecting rod drive shaft carried by said reciprocatory shaft, a connecting rod connecting said crankshaft with said auxiliary connecting rod drive shaft, and means enabling said reciprocatory shaft to transfer the drive of said crankshaft from the first connecting rods to the last-mentioned connecting rod whenever the rotation of said crankshaft would be otherwise prevented due to the cranks of said crankshaft having stopped in a dead center position.

2. In a driving arrangement for converting reciprocating motion into rotary motion, a crankshaft having two cranks positioned off-center with respect to each other, an assembly associated with said crankshaft and including a pair of connecting rods connecting the assembly with the cranks of said drive shaft, means in said assembly for driving said crankshaft through the medium of one of said connecting rods alone as long as the driving speed maintains sufficient inertia in said crankshaft to carry it past dead center positions, and means in said assembly for driving said crankshaft off dead center with respect to said first connecting rod through the medium of the other connecting rod when the inertia is insufficient to do so.

3. In a driving arrangement for converting reciprocating motion into rotary motion, a casing, a crankshaft mounted for rotation within said casing, a pair of connecting rod carriers, a pair of connecting rods connecting the cranks of said crankshaft with said carriers, means common to said carriers for rotating said crankshaft through the medium of either of said connecting rods, and means enabling the crankshaft to drive one of said connecting rods and its carrier while being driven by the other of said connecting rods.

4. In a driving arrangement for converting reciprocating motion into rotary motion, a crankshaft, a reciprocatory element for driving said crankshaft, means enabling said element to be reciprocated a limited distance while the said crankshaft remains stationary, and means operated by a further movement of said element at such time to then drive said crankshaft.

5. In a driving arrangement for converting reciprocating motion into rotary motion, a reciprocating drive shaft, a crankshaft, a connecting rod having one end thereof connected to a crank of said crankshaft; an element, to which the other end of said connecting rod is pivoted, flexibly secured to said drive shaft and through the medium of which a specific distance of movement of the drive shaft in either direction can move the crankshaft into a dead center position with respect to said connecting rod; and means operated by a subsequent movement of said shaft for then moving said crankshaft off the specified dead center position.

6. In a driving arrangement for converting reciprocating motion into rotary motion, a cylinder comprising a connecting rod carrier, a drive shaft partially enclosed by said casing, springs surrounding the enclosed portion of said drive shaft and having means co-operating therewith to normally hold said cylinder and drive shaft in a definite relation to each other under the tension of said springs, a crankshaft having a crank linked to said cylinder by a connecting rod and by means of which said shaft and cylinder can rotate said crankshaft to a dead center position, an auxiliary connecting rod carrier having a connecting rod linked to a second crank of said crankshaft; and means carried by said drive shaft, which moves said auxiliary connecting rod carrier by a movement of the shaft with respect to said cylinder made possible by a further compression of one of said springs, to move said crankshaft off the dead center position.

7. In a driving arrangement for converting reciprocatory motion into rotary motion, a casing in one end of which a crankshaft is mounted and in the other end of which a reciprocatory element is mounted, a connecting rod linked between said element and crankshaft, means extending from within said element and reciprocatory therewith to rotate said crankshaft; and an auxiliary oscillating driving means, set in motion by said reciprocatory element after the crankshaft has stopped in a dead center position with respect to said reciprocating element, to move the crankshaft off such dead center position.

8. In a device for overcoming dead centers, a crankshaft having two cranks positioned at an angle with respect to each other, a reciprocatory element for driving said crankshaft, means intermediate to said cranks and said element enabling power applied to said element to be directly transmitted to one of said cranks exclusively so long as the speed and load driven by said crankshaft generates sufficient inertia to carry such crank past its dead center points and enabling power applied to said element to be transferred to the other of said cranks each time the speed and load driven by said crankshaft fails to carry the first employed crank past one of its dead center positions.

In witness whereof, I hereunto subscribe my name this 21st day of November, 1931.

JOHN P. KELLY.